United States Patent [19]

Aufderheide et al.

[11] 4,335,372
[45] Jun. 15, 1982

[54] DIGITAL SCALING APPARATUS

[75] Inventors: Maurice B. Aufderheide, Scottsdale; Sam M. Daniel, Tempe, both of Ariz.

[73] Assignee: Motorola Inc., Schaumbur, Ill.

[21] Appl. No.: 134,859

[22] Filed: Mar. 28, 1980

[51] Int. Cl.³ .............................................. G06F 3/00
[52] U.S. Cl. ............................. 340/347 DD; 235/310; 364/900; 364/748
[58] Field of Search ...................... 340/347 DD, 146.2; 235/310; 364/200, 900, 745, 748, 582

[56] References Cited

U.S. PATENT DOCUMENTS

| | | | |
|---|---|---|---|
| 3,064,239 | 11/1962 | Svigals | 340/347 DD |
| 3,234,368 | 2/1966 | Kregness | 364/748 |
| 3,831,012 | 8/1974 | Tate | 364/748 |
| 3,916,388 | 10/1975 | Shimp | 364/200 |
| 3,934,132 | 1/1976 | Desmonds | 364/745 |
| 4,139,899 | 2/1979 | Tulpule | 364/900 |

FOREIGN PATENT DOCUMENTS 2312178  9/1974  Fed. Rep. of Germany ...... 235/310

Primary Examiner—Charles D. Miller
Attorney, Agent, or Firm—Eugene A. Parsons

[57] ABSTRACT

Digital scaling apparatus adapted to receive a plurality of digital signals each composed of a plurality of bits which first encodes each of the digital signals in accordance with the number of left shifts possible in each signal without losing any data, and then compares the encoded signals to select the largest digital signal, which selected encoded signal is used as a command to shift all of the digital signals an amount necessary to left justify the largest digital signal.

11 Claims, 4 Drawing Figures

DIGITAL SCALING APPARATUS

BACKGROUND OF THE INVENTION

When dealing with relatively large amounts of digital numbers which vary radically in amplitude or size it is imperative that the system incorporate appropriate adaptive scaling if the system is to maintain a high degree of numerical accuracy. In a digital system where each number is represented by a digital word having a plurality of bits and the system performs a variety of mathematical operations, small and extremely small numbers can be lost completely in the operations without some form of adaptive scaling. Adaptive scaling basically involves starting at the left (most significant bit) and searching toward the right for the first most significant magnitude bit and then shifting the entire word to the left the number of bits required to place the most significant magnitude bit in the second most significant bit location of the digital word. This is generally referred to as "left justifying" the digital word. In adaptive scaling systems it is, of course, necessary to remember the number of bits that each word is left-shifted since each shift represents multiplication by 2. Thus, when a digital word is shifted three bits to the left, a $2^3$ multiplication factor must be associated with the number represented by the digital word.

Adaptive scaling also includes shifting, of previously scaled digital words, up or down so that the bits of the digital word will correspond with other digital words so that addition or subtraction, may be performed properly.

SUMMARY OF THE INVENTION

The present invention pertains to digital scaling apparatus including input means for receiving in parallel a plurality of digital signals each composed of a plurality of bits, encoding means for generating a digital shift command for each digital signal representative of the number of bits the digital signal must be shifted to left justify it, means for comparing a number of shift commands (for a number of digital words) for selecting the shift command representative of the fewest number of bits to be shifted, and bit shifting means connected to receive in parallel the plurality of digital signals and the selected shift command for shifting each of the plurality of digital signals the number of bits represented by the selected shift command.

It is an object of the present invention to provide new and improved digital scaling apparatus.

It is a further object of the present invention to provide new and improved digital scaling apparatus wherein a plurality of digital signals are shifted to occupy the most significant bit locations possible without losing any information.

It is a further object of the present invention to provide new and improved digital scaling apparatus including improved and simplified bit shifting circuitry.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the FIGURES.

DESCRIPTION OF THE PREFERRED EMBODIMENT

Figure 1:
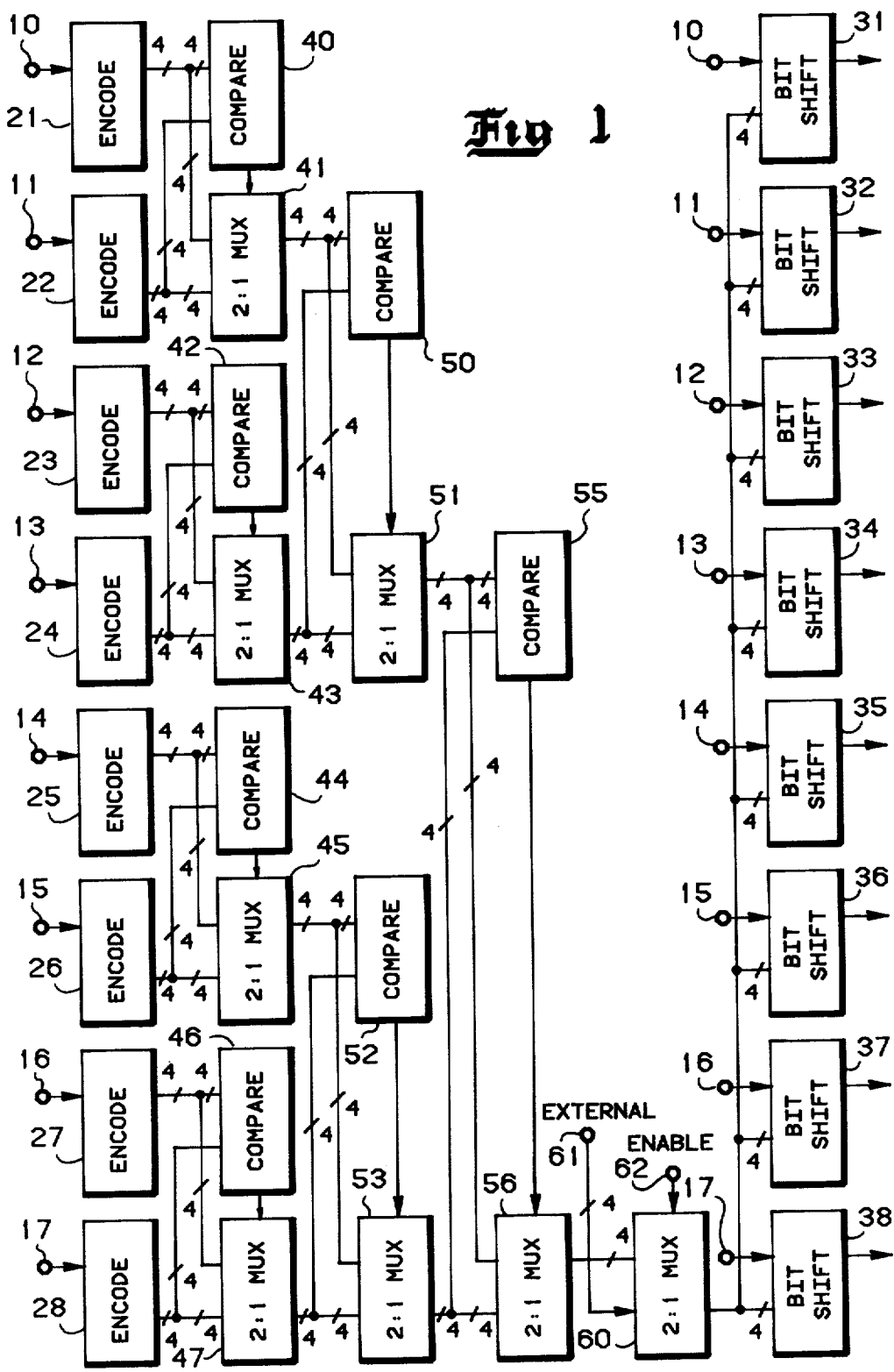
FIG. 1 is a block diagram of digitial scaling apparatus incorporating the present invention.

Referring specifically to FIG. 1, a block diagram of digital scaling apparatus embodying the present invention is illustrated. In the present embodiment eight input terminals numbered consecutively 10 through 17 are each adapted to receive a digital signal composed of twenty binary bits. The eight input terminals are connected to eight encoding circuits numbered consecutively 21 through 28, which only utilize the upper 16 bits, and to eight bit shifting circuits numbered consecutively 31 through 38. Digital signals on the eight input terminals 10 through 17 are applied in parallel to the encode and bit-shift circuits and the twenty bits (or upper 16 bits) of each of the digital signals are applied in parallel to the specific circuit. That is, while the input terminal 10 is illustrated as a single terminal, it consists of twenty input lines 16 of which are applied in parallel to the encode circuit 21, and 20 of which are applied to the bit-shifting circuit 31. In a similar fashion each of the other input terminals 11 through 17 consists of twenty input lines with the twenty bits of any digital signal appearing thereon in parallel, or simultaneously.

The encoding circuits 21 through 28 are designed to priority encode the upper 16 bits of the 20-bit input word to a 4-bit word representing the number of left justified shifts that are necessary to produce an output 16-bit word with a sign bit at the most significant bit location followed by magnitude bits and an appropriate number of trailing zeros. A truth table for the encoding circuits 21 through 28 is illustrated in Table 1. Table 1 illustrates the 4-bit word output required to represent the number of left-justified shifts for each possible 20-bit word applied to the input terminals 10–17. In the truth table X's represent a don't care state. Since the $I_{19}$ bit represents a sign bit the $I_{18}$ bit is the most significant bits. Therefore, it can be seen that the first 20-bit word of the truth table is left-justified. The second 20-bit word requires a one bit-shift for left-justication which is represented by the 4-bit output word, 0001. Further, a "0" in the sign bit location represents a positive number and a "1" in the sign bit location represents a negative number. Thus, the seventeenth input word of Table 1 is also left-justified, the eighteenth word requires one shift, etc. In the present embodiment the encoding circuits 21 through 28 were generated by programming Field Programmable Logic Arrays (Signetics type SIG82S100) using the 16 most significant bits of the truth table.

The 4-bit output word from the encoders 21 and 22 are each applied by means of four lines to a comparator 40 and a 2:1 multiplexing circuit 41. The comparator compares the two 4-bit output words from the encoders 21 and 22, selects the smaller of the two (least number of left shifts required to left-justify the digital signal) and commands the multiplexing circuit 41 to pass the selected 4-bit word. In a similar fashion the 4-bit output words from the encoding circuits 23 and 24 are applied on four line connections to a comparator 42 and a 2:1 multiplexing circuit 43, the 4-bit output words of the encoding circuits 25 and 26 are applied on four-line connections to a comparator 44 and a 2:1 multiplexing circuit 45, and the 4-bit output words of the encoders 27 and 28 are applied on four line connections to a comparator 46 and a 2:1 multiplexing circuit 47. The 4-bit words supplied by the 2:1 multiplexing circuits 41 and 43 are each applied by way of four-line connections to a comparator 50 and 2:1 multiplexing circuit 51.

through 38 is selected by means of a signal on an enable terminal 62 of the multiplexing circuit 60. The output of the multiplexing circuit 60 is applied as a shift command to the bit shifting circuits 31 through 38.

Each of the bit-shifting circuits 31 through 38 is connected to receive one of the 20-bit input words applied to the input terminals 10 through 17, respectively, and the 4-bit shift command word from the multiplexing circuit 60. Each of the bit shifting circuits 31 through 38

TABLE 1

| INPUT 20-BIT WORD | | | | | | | | | | | | | | | | | | | | OUTPUT | | | |
|---|---|---|---|---|---|---|---|---|---|---|---|---|---|---|---|---|---|---|---|---|---|---|---|
| $I_{19}$ | $I_{18}$ | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | $S_3$ | $S_2$ | $S_1$ | $S_0$ |
| 0 | 1 | X | X | X | X | X | X | X | X | X | X | X | X | X | X | X | X | X | X | 0 | 0 | 0 | 0 |
| 0 | 0 | 1 | X | X | X | X | X | X | X | X | X | X | X | X | X | X | X | X | X | 0 | 0 | 0 | 1 |
| 0 | 0 | 0 | 1 | X | X | X | X | X | X | X | X | X | X | X | X | X | X | X | X | 0 | 0 | 1 | 0 |
| 0 | 0 | 0 | 0 | 1 | X | X | X | X | X | X | X | X | X | X | X | X | X | X | X | 0 | 0 | 1 | 1 |
| 0 | 0 | 0 | 0 | 0 | 1 | X | X | X | X | X | X | X | X | X | X | X | X | X | X | 0 | 1 | 0 | 0 |
| 0 | 0 | 0 | 0 | 0 | 0 | 1 | X | X | X | X | X | X | X | X | X | X | X | X | X | 0 | 1 | 0 | 1 |
| 0 | 0 | 0 | 0 | 0 | 0 | 0 | 1 | X | X | X | X | X | X | X | X | X | X | X | X | 0 | 1 | 1 | 0 |
| 0 | 0 | 0 | 0 | 0 | 0 | 0 | 0 | 1 | X | X | X | X | X | X | X | X | X | X | X | 0 | 1 | 1 | 1 |
| 0 | 0 | 0 | 0 | 0 | 0 | 0 | 0 | 0 | 1 | X | X | X | X | X | X | X | X | X | X | 1 | 0 | 0 | 0 |
| 0 | 0 | 0 | 0 | 0 | 0 | 0 | 0 | 0 | 0 | 1 | X | X | X | X | X | X | X | X | X | 1 | 0 | 0 | 1 |
| 0 | 0 | 0 | 0 | 0 | 0 | 0 | 0 | 0 | 0 | 0 | 1 | X | X | X | X | X | X | X | X | 1 | 0 | 1 | 0 |
| 0 | 0 | 0 | 0 | 0 | 0 | 0 | 0 | 0 | 0 | 0 | 0 | 1 | X | X | X | X | X | X | X | 1 | 0 | 1 | 1 |
| 0 | 0 | 0 | 0 | 0 | 0 | 0 | 0 | 0 | 0 | 0 | 0 | 0 | 1 | X | X | X | X | X | X | 1 | 1 | 0 | 0 |
| 0 | 0 | 0 | 0 | 0 | 0 | 0 | 0 | 0 | 0 | 0 | 0 | 0 | 0 | 1 | X | X | X | X | X | 1 | 1 | 0 | 1 |
| 0 | 0 | 0 | 0 | 0 | 0 | 0 | 0 | 0 | 0 | 0 | 0 | 0 | 0 | 0 | 1 | X | X | X | X | 1 | 1 | 1 | 0 |
| 0 | 0 | 0 | 0 | 0 | 0 | 0 | 0 | 0 | 0 | 0 | 0 | 0 | 0 | 0 | 0 | X | X | X | X | 1 | 1 | 1 | 1 |
| 1 | 0 | X | X | X | X | X | X | X | X | X | X | X | X | X | X | X | X | X | X | 0 | 0 | 0 | 0 |
| 1 | 1 | 0 | X | X | X | X | X | X | X | X | X | X | X | X | X | X | X | X | X | 0 | 0 | 0 | 1 |
| 1 | 1 | 1 | 0 | X | X | X | X | X | X | X | X | X | X | X | X | X | X | X | X | 0 | 0 | 1 | 0 |
| 1 | 1 | 1 | 1 | 0 | X | X | X | X | X | X | X | X | X | X | X | X | X | X | X | 0 | 0 | 1 | 1 |
| 1 | 1 | 1 | 1 | 1 | 0 | X | X | X | X | X | X | X | X | X | X | X | X | X | X | 0 | 1 | 0 | 0 |
| 1 | 1 | 1 | 1 | 1 | 1 | 0 | X | X | X | X | X | X | X | X | X | X | X | X | X | 0 | 1 | 0 | 1 |
| 1 | 1 | 1 | 1 | 1 | 1 | 1 | 0 | X | X | X | X | X | X | X | X | X | X | X | X | 0 | 1 | 1 | 0 |
| 1 | 1 | 1 | 1 | 1 | 1 | 1 | 1 | 0 | X | X | X | X | X | X | X | X | X | X | X | 0 | 1 | 1 | 1 |
| 1 | 1 | 1 | 1 | 1 | 1 | 1 | 1 | 1 | 0 | X | X | X | X | X | X | X | X | X | X | 1 | 0 | 0 | 0 |
| 1 | 1 | 1 | 1 | 1 | 1 | 1 | 1 | 1 | 1 | 0 | X | X | X | X | X | X | X | X | X | 1 | 0 | 0 | 1 |
| 1 | 1 | 1 | 1 | 1 | 1 | 1 | 1 | 1 | 1 | 1 | 0 | X | X | X | X | X | X | X | X | 1 | 0 | 1 | 0 |
| 1 | 1 | 1 | 1 | 1 | 1 | 1 | 1 | 1 | 1 | 1 | 1 | 0 | X | X | X | X | X | X | X | 1 | 0 | 1 | 1 |
| 1 | 1 | 1 | 1 | 1 | 1 | 1 | 1 | 1 | 1 | 1 | 1 | 1 | 0 | X | X | X | X | X | X | 1 | 1 | 0 | 0 |
| 1 | 1 | 1 | 1 | 1 | 1 | 1 | 1 | 1 | 1 | 1 | 1 | 1 | 1 | 0 | X | X | X | X | X | 1 | 1 | 0 | 1 |
| 1 | 1 | 1 | 1 | 1 | 1 | 1 | 1 | 1 | 1 | 1 | 1 | 1 | 1 | 1 | 0 | X | X | X | X | 1 | 1 | 1 | 0 |
| 1 | 1 | 1 | 1 | 1 | 1 | 1 | 1 | 1 | 1 | 1 | 1 | 1 | 1 | 1 | 1 | X | X | X | X | 1 | 1 | 1 | 1 |

Again, the comparator 50 compares the two 4-bit words, selects the smaller of the two and commands the multiplexing circuit 51 to pass the selected word. In a similar fashion the 4-bit output words from the multiplexing circuits 45 and 47 are each applied by way of four line connections to a comparator 52 and a 2:1 multiplexing circuit 53. The 4-bit output words from the multiplexing circuits 51 and 53 are each applied by way of four line connections to a comparator 55 and a 2:1 multiplexing circuit 56. The comparators 40, 42, 44, 46, 50, 52 and 55 compare each of the 4-bit words, or shift commands, to all of the remaining 4-bit words, or shift commands, to ultimately select the shift command representative of the fewest number of bits to be shifted. In this embodiment the comparators are a commercially available circuit designated 74S85 and the 2:1 multiplexer (MUX) circuit is commercially available under the number 74S157, although it will be understood by those skilled in the art that many other types of circuits might be utilized and that these are specified for example only.

The 4-bit output word from the multiplexing circuit 56 may be applied directly to the bit-shifting circuits 31 through 38 as a shift command, or as in the present embodiment, may be applied to a 2:1 multiplexing circuit 60, which circuit may receive an external 4-bit shifting command on a terminal 61. The shift command which is to be applied to the bit shifting circuits 31 contains circuitry which is shown in more detail in FIG. 2. In the present embodiment each bit-shifting circuit 31 through 38 is composed of nine bit-shifting components which, in this embodiment, are a commercially available IC package designated AM25S10. Each of the IC packages has seven input terminals, four output terminals and three state control output terminals. The nine bit-shifting IC packages 65 through 69 are connected as first components while four of the IC packages 72 through 75 are connected as second components.

The seven inputs of the bit-shifting component 65 are connected to the seven most significant bits of the 20-bit input, in this example input 10. The seven inputs of the second bit-shifting component 66 are connected to receive the three least significant bits applied to the component 65 and the next four most-significant bits. Thus, if the input lines are numbered 0 through 19 with the number 19 having the most significant bit applied thereto and the number 0 having the least significant bit applied thereto, the lines 13 though 19 are connected to the seven inputs of the component 65 and the lines 9 through 15 are applied to the seven inputs of the component 66. In a similar fashion lines 5 through 11 are connected to the seven inputs of the component 67, lines 1 through 7 are connected to the seven inputs of the component 68 and lines 0 through 3 are connected to the four most significant inputs of the component 69 while the three least significant bits of the component 69 are held at zero. The four leads from the multiplexing circuit 60 carrying the 4-bit shift command are illustrated as four input terminals in FIG. 2 designated $S_0$, $S_1$, $S_2$ and $S_3$ in the order of their significance. The shift commands are also illustrated in Table 2 and correspond with the 4-bit output words illustrated in Table 1. The two least significant bits, $S_0$ and $S_1$, of the 4-bit shift command are connected in parallel to two central terminals of each of the components 63 through 69.

The four output leads of the component 65 are connected to the upper lead, adapted to receive the most significant bit, of each of the second components 72 through 75. The four output leads of the component 66 are connected to the second most significant input lead of each of the components 72 through 75, the four output leads of the component 67 are connected to the third most significant lead, the four output leads of the component 68 are connected to the fourth most signifi-

TABLE 2

| SHIFT COMMAND | | | | OUTPUT WORD | | | | | | | | | | | | | | | |
|---|---|---|---|---|---|---|---|---|---|---|---|---|---|---|---|---|---|---|---|
| $S_3$ | $S_2$ | $S_1$ | $S_0$ | $O_{15}$ | $O_{14}$ | $O_{13}$ | $O_{12}$ | $O_{11}$ | $O_{10}$ | $O_9$ | $O_8$ | $O_7$ | $O_6$ | $O_5$ | $O_4$ | $O_3$ | $O_2$ | $O_1$ | $O_0$ |
| 0 | 0 | 0 | 0 | $I_{19}$ | $I_{18}$ | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ |
| 0 | 0 | 0 | 1 | $I_{18}$ | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ |
| 0 | 0 | 1 | 0 | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ |
| 0 | 0 | 1 | 1 | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ |
| 0 | 1 | 0 | 0 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ |
| 0 | 1 | 0 | 1 | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | 0 |
| 0 | 1 | 1 | 0 | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | 0 | 0 |
| 0 | 1 | 1 | 1 | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | $I_0$ | 0 | 0 | 0 |
| 1 | 0 | 0 | 0 | $I_{11}$ | $I_{10}$ | $I_9$ | $I_8$ | $I_7$ | $I_6$ | $I_5$ | $I_4$ | $I_3$ | $I_2$ | $I_1$ | $I_0$ | 0 | 0 | 0 | 0 |
| 1 | 0 | 0 | 1 | $I_{10}$ | $I_9$ | $I_8$ | $I_7$ | $I_6$ | $I_5$ | $I_4$ | $I_3$ | $I_2$ | $I_1$ | $I_0$ | 0 | 0 | 0 | 0 | 0 |
| 1 | 0 | 1 | 0 | $I_9$ | $I_8$ | $I_7$ | $I_6$ | $I_5$ | $I_4$ | $I_3$ | $I_2$ | $I_1$ | $I_0$ | 0 | 0 | 0 | 0 | 0 | 0 |
| 1 | 0 | 1 | 1 | $I_8$ | $I_7$ | $I_6$ | $I_5$ | $I_4$ | $I_3$ | $I_2$ | $I_1$ | $I_0$ | 0 | 0 | 0 | 0 | 0 | 0 | 0 |
| 1 | 1 | 0 | 0 | $I_7$ | $I_6$ | $I_5$ | $I_4$ | $I_3$ | $I_2$ | $I_1$ | $I_0$ | 0 | 0 | 0 | 0 | 0 | 0 | 0 | 0 |
| 1 | 1 | 0 | 1 | $I_6$ | $I_5$ | $I_4$ | $I_3$ | $I_2$ | $I_1$ | $I_0$ | 0 | 0 | 0 | 0 | 0 | 0 | 0 | 0 | 0 |
| 1 | 1 | 1 | 0 | $I_5$ | $I_4$ | $I_3$ | $I_2$ | $I_1$ | $I_0$ | 0 | 0 | 0 | 0 | 0 | 0 | 0 | 0 | 0 | 0 |
| 1 | 1 | 1 | 1 | $I_4$ | $I_3$ | $I_2$ | $I_1$ | $I_0$ | 0 | 0 | 0 | 0 | 0 | 0 | 0 | 0 | 0 | 0 | 0 |

In the operation of the components 65 through 69, with a "0" (or low) on the two shift-command terminals $S_0$ and $S_1$, the four most significant bits applied to the inputs of each of the components 65 through 69 are conveyed directly through the components to the output leads thereof. Thus, leads 19, 18, 17 and 16 are connected to the four output leads of the component 65, leads 15, 14, 13 and 12 are connected through the component 66 to the four output leads thereof, etc. so that signals on all of the input leads 0 through 19 are connected directly to the twenty output leads of the components 65 through 69.

Figure 2:
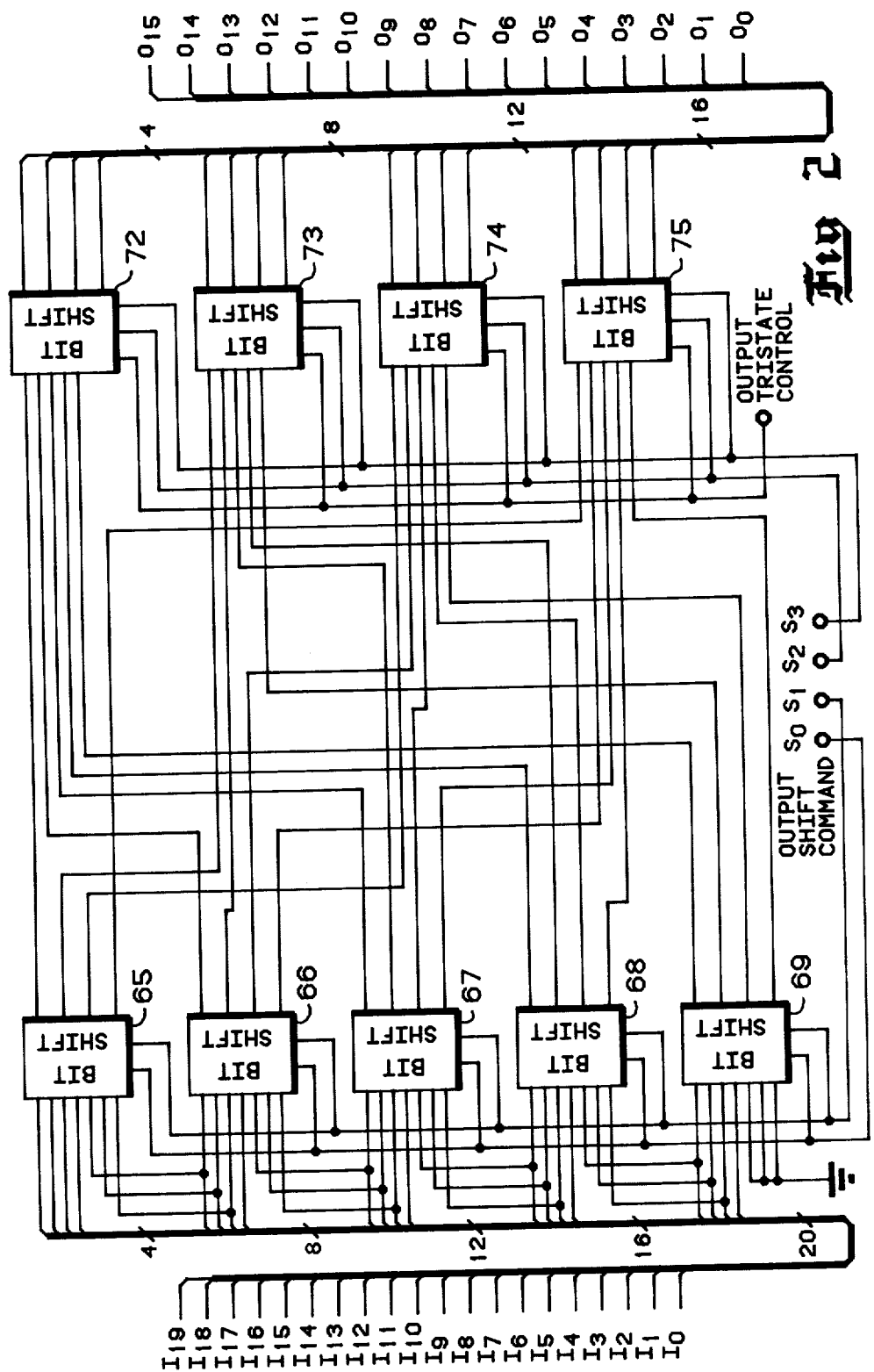
FIG. 2 is a more detailed block diagram of a portion of FIG. 1.

If a one is applied to the shift command terminal $S_0$ with zeros applied to the remaining terminals (command for one shift), each of the components 65 through 69 are controlled so that the lead carrying the most significant bit is disconnected and the next lead is connected in its place to convey the next most significant bit to the output. Thus, with a one on the $S_0$ shift-command terminal as described, the components 65 through 69 shift the entire 20-bit input word one bit to the left so that the most significant bit (line 19) is shifted out of the word. When a one is applied to the shift command terminal $S_1$ and all of the remaining terminals have a zero thereon, the first components 65 through 69 shift the input signal two bits to the left so that the two most significant bits (lines 19 and 18) are shifted out of the word. If a one appears on both of the shift command terminals $S_0$ and $S_1$, the first components 65 through 69 shift the 20-bit input word three bits to the left so that the three most significant lines (lines 19, 18 and 17) are shifted out of the word. It should be noted that for each bit shifted to the left and when zeros added as the least significant bit by the component 69. Therefore, the first components 65 through 69, upon receiving the proper command signals are capable of shifting the incoming 20-bit word one, two or three bits, in one bit steps. All of the components illustrated in FIG. 2 are shown with the most significant bit (input and output) at the top thereof, and the least significant bit at the bottom.

cant lead and the four output leads of the component 69 are connected to the fifth most significant input lead of the components 72 through 75. The remaining two input leads of each of the components 72 through 75 are held at zero or ground. The four output leads of each of the components 72 through 75 form the 16-bit output word which is illustrated in Table 2. The output of the second components 72 through 75 are not shown in order of significance and are connected generally as follows. The four most significant bits of the word appear on the first or top lines of each of the components 72 through 75, with the most significant bit appearing at the top line of component 72. The next four most significant bits appear on the second output lines of each of the components 72 through 75, with the next four most significant bits appearing on the third lines and the four least significant bits appearing on the fourth lines. Thus, with zero appearing on all four shift command input terminals, input bits $I_{19}$, $I_{15}$, $I_{11}$ and $I_7$ will appear, respectively from top to bottom, at the four output leads of the component 72 while the remaining 12 leads of the components 73, 74 and 75 will have input bits $I_{18}$, $I_{14}$, $I_{10}$, $I_6$, $I_{17}$, $I_{13}$, $I_9$, $I_5$, $I_{16}$, $I_{12}$, $I_8$ and $I_4$, respectively. It can be seen that the sixteen most significant bits of the 20-bit input word are maintained while the four least significant bits are dropped for the specified shift command.

When a one is applied to the shift command input terminal $S_2$ with the remaining three terminals at zero, the second components 72 through 75 shift the input word four bits so that the first four input bits (lines 19 and 18) are dropped from the output word. This is accomplished by internally switching the second components 72 through 75 so that the four output leads are internally connected to the four input leads between the most significant (pin 7) and the two least significant (pins 1 and 2). It will be noted that this disconnects the four output leads of the component 65 from the outputs of the components 72 through 75 and, thereby, removes the four most significant bits of the input word from the output word. In a similar fashion a one on the shift command input terminals $S_3$ causes the output leads of the components 72 through 75 to be connected internally to the four leads between the two most significant input leads and the one least significant input lead, which removes the eight most significant bits of the input word (the output leads of components 65 and 66)

disclosed illustrate different numbers of bit-shifting components interconnected in different ways to provide the novel results and it will be understood by those skilled in the art that numbers of components and interconnections, other than those illustrated, may be utilized to provide any desired amount and direction of bit-shifting capability.

TABLE 3

| SHIFT COMMAND | | | | OUTPUT WORD | | | | | | | | | | | | | | | |
|---|---|---|---|---|---|---|---|---|---|---|---|---|---|---|---|---|---|---|---|
| $S_3$ | $S_2$ | $S_1$ | $S_0$ | $O_{15}$ | $O_{14}$ | $O_{13}$ | $O_{12}$ | $O_{11}$ | $O_{10}$ | $O_9$ | $O_8$ | $O_7$ | $O_6$ | $O_5$ | $O_4$ | $O_3$ | $O_2$ | $O_1$ | $O_0$ |
| 0 | 0 | 0 | 0 | $I_{19}$ | $I_{19}$ | $I_{19}$ | $I_{19}$ | $I_{19}$ | $I_{19}$ | $I_{19}$ | $I_{19}$ | $I_{18}$ | $I_{17}$ | $I_{16}$ | $I_{15}$ | $I_{14}$ | $I_{13}$ | $I_{12}$ | $I_{11}$ |
| 0 | 0 | 0 | 1 | $I_{19}$ | $I_{19}$ | $I_{19}$ | $I_{19}$ | $I_{19}$ | $I_{19}$ | $I_{19}$ | $I_{18}$ | $I_{17}$ | $I_{16}$ | $I_{15}$ | $I_{14}$ | $I_{13}$ | $I_{12}$ | $I_{11}$ | $I_{10}$ |
| 0 | 0 | 1 | 0 | $I_{19}$ | $I_{19}$ | $I_{19}$ | $I_{19}$ | $I_{19}$ | $I_{19}$ | $I_{18}$ | $I_{17}$ | $I_{16}$ | $I_{15}$ | $I_{14}$ | $I_{13}$ | $I_{12}$ | $I_{11}$ | $I_{10}$ | $I_9$ |
| 0 | 0 | 1 | 1 | $I_{19}$ | $I_{19}$ | $I_{19}$ | $I_{19}$ | $I_{19}$ | $I_{18}$ | $I_{17}$ | $I_{16}$ | $I_{15}$ | $I_{14}$ | $I_{13}$ | $I_{12}$ | $I_{11}$ | $I_{10}$ | $I_9$ | $I_8$ |
| 0 | 1 | 0 | 0 | $I_{19}$ | $I_{19}$ | $I_{19}$ | $I_{19}$ | $I_{18}$ | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ |
| 0 | 1 | 0 | 1 | $I_{19}$ | $I_{19}$ | $I_{19}$ | $I_{18}$ | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ |
| 0 | 1 | 1 | 0 | $I_{19}$ | $I_{19}$ | $I_{18}$ | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ |
| 0 | 1 | 1 | 1 | $I_{19}$ | $I_{18}$ | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ |
| 1 | 0 | 0 | 0 | $I_{18}$ | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ |
| 1 | 0 | 0 | 1 | $I_{17}$ | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ |
| 1 | 0 | 1 | 0 | $I_{16}$ | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ |
| 1 | 0 | 1 | 1 | $I_{15}$ | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | 0 |
| 1 | 1 | 0 | 0 | $I_{14}$ | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | 0 | 0 |
| 1 | 1 | 0 | 1 | $I_{13}$ | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | 0 | 0 | 0 |
| 1 | 1 | 1 | 0 | $I_{12}$ | $I_{11}$ | $I_{10}$ | $I_9$ | $I_8$ | $I_7$ | $I_6$ | $I_5$ | $I_4$ | $I_3$ | $I_2$ | $I_1$ | 0 | 0 | 0 | 0 |
| 1 | 1 | 1 | 1 | $I_{11}$ | $I_{10}$ | $I_9$ | $I_8$ | $I_7$ | $I_6$ | $I_5$ | $I_4$ | $I_3$ | $I_2$ | $I_1$ | 0 | 0 | 0 | 0 | 0 | from the output word. A one on both of the shift command input terminals $S_2$ and $S_3$ internally connects the output leads of each of the components 72 through 75 to the four least significant input leads, which removes from the output word the input bits appearing at the output leads of the component 67 as well as the components 66 and 65, namely 12 bits. Thus, the second components 72 through 75 shift the output word in four bit steps. As described, the circuit illustrated in FIG. 2 can be controlled with the shift commands set forth in Table 2 to provide the bit shifting set forth in Table 2.

Figure 3:
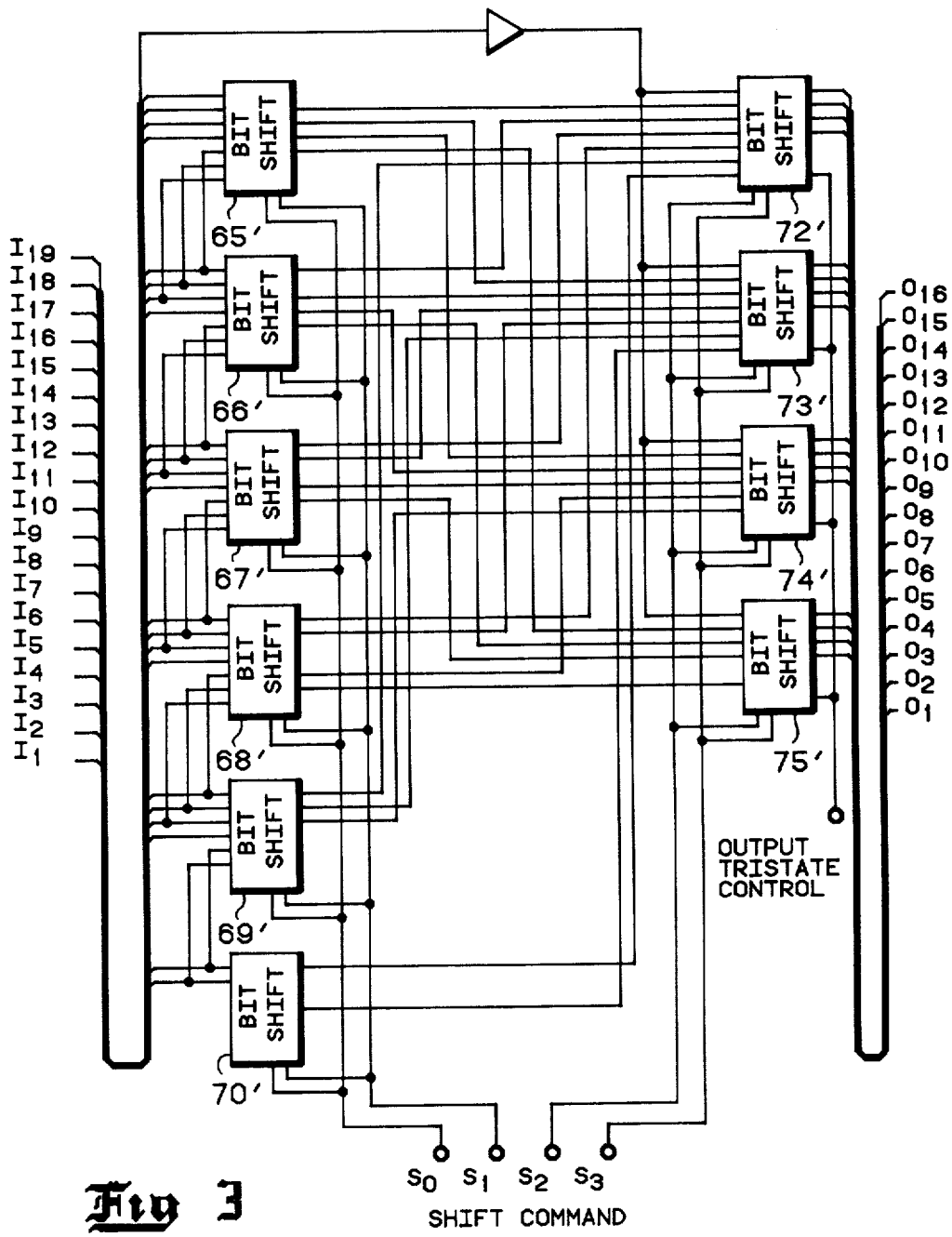
FIG. 3 is a block diagram of another embodiment of digital scaling apparatus incorporating the present invention.

Referring specifically to FIG. 3, another embodiment of a bit shifting circuit is illustrated. In the embodiment of FIG. 3, an additional bit shifting component is included in the line of first components, designated 65' through 70' while four bit shifting components 72' through 75' are connected in a second line. Basically, the components are similar to those previously described in conjunction with FIG. 2 and operate in a similar fashion but the connections are such that the shift command (for a positive signal) which produces no shift in the incoming signal is 0111. The circuit illustrated in FIG. 3 is capable of a maximum of eight bits of up-shift and seven bits of down-shift, which will be obvious from a perusal of Table 3. From Table 3 it is clear that a command of 0000 provides a −7 bit shift and as the command increases the shift increases. Thus, FIG. 3 and Table 3 fully disclose a bit-shifting circuit capable of up-shifting and down-shifting a predetermined amount.

Figure 4:
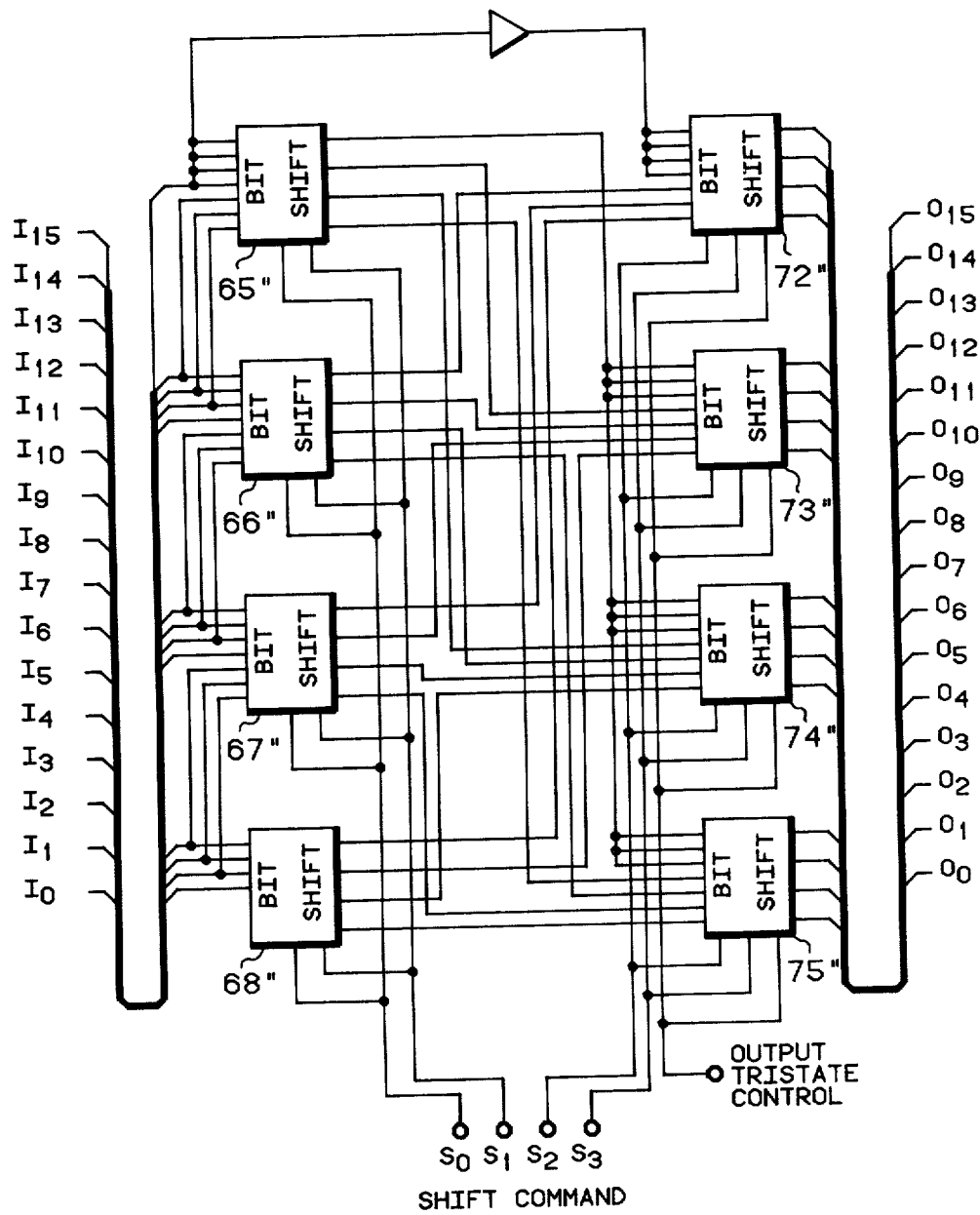
FIG. 4 is a block diagram of another embodiment of digital scaling apparatus incorporating the present invention.

FIG. 4 illustrates another embodiment wherein four bit-shifting components 65" through 68" are connected in a first line while four bit-shifting components 72" through 75" are connected in a second line of components and all of the components are interconnected to provide a maximum 15-bit down-shift. In this embodiment a command of 1111 corresponds to an effective zero shift at the output while a command of 0000 corresponds with a down shift of fifteen bits.

Thus, several embodiments of bit shifting circuitry have been disclosed wherein an incoming multi-bit word can be shifted up, down, or either. The circuits Digital scaling apparatus has been disclosed which receives a plurality of digital signals each composed of a plurality of bits and which selects the largest number represented by the digital signals to supply a shift-command to digital shifting circuity which shifts all of the digital signals so that the selected digital signal is left justified. It will of course be understood that the terms "left-shift" and "left-justified" have been used throughout the specification since the normal operation is to illustrate the most significant bit at the left end of a digital word. However, if a different orientation is illustrated the terms "left-justified" and "left-shift" simply means that the bits are shifted toward the most significant bit. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirt and scope of this invention.

We claim:

1. Digital scaling apparatus comprising:
   (a) encoding means adapted to receive a plurality of digital words each composed of a plurality of bits and provide a digital shift command for each digital word representative of the number of bits the digital word must be shifted to left-justify it;
   (b) comparing means for comparing each of the shift commands to all of the remaining shift commands and selecting the shift command representative of the fewest number of bits to be shifted; and
   (c) bit shifting means connected to receive the plurality of digital words and the selected shift command for shifting each of the plurality of digital words the number of bits represented by the selected shift command.

2. Digital scaling apparatus as claimed in claim 1 wherein the digital shift commands are compared in pairs and the comparison means for each pair of digital shift commands includes a comparator circuit and a multiplexing circuit each connected to receive the pair of digital shift commands with the multiplexing circuit further connected to the comparator circuit for controlling the multiplexing circuit to pass only the digital shift command of the pair representative of the most closely left justified digital word.

3. Digital scaling apparatus as claimed in claim 1 wherein the bit shifting means includes a plurality of bit shifting circuits each having a plurality of inputs and components connected to receive some of the bits of a digital word thereon, the plurality of bit-shifting components being interconnected so that the plurality of bits of a digital word normally retains the same bit-significance in the output and the entire digital word is shifted one bit, in response to a shift command from the comparing means, to shift the most significant bit out of the digital word with all of the remaining bits being shifted one bit to the left.

4. Digital scaling apparatus as claimed in claim 3 wherein each bit-shifting circuit includes at least one second bit shifting component connected to the output of the plurality of bit shifting components so that the plurality of bits normally retains the same bit significance as in the output of the plurality of bit shifting components and the entire digital word is shifted by a plurality of bits, in response to a shift command from the comparing means, to shift a similar plurality of the most significant bits out of the output with all of the remaining bits being shifted a similar plurality to the left.

5. Digital scaling apparatus as claimed in claim 1 wherein at least one of the plurality of digital words is composed of at least twenty bits and the bit shifting means includes a circuit for receiving the one digital word, which circuit includes at least five first bit shifting components each connected to receive seven of the twenty bits with three of the least significant bits of the seven bits supplied to each first bit-shifting component being supplied in parallel to an adjacent one of the first bit-shifting components as the three most significant bits and the three least significant bits of the final first bit-shifting component being held at zero for shifting the one digital word by one bit steps.

6. Digital scaling apparatus as claimed in claim 5 wherein the circuit of the bit-shifting means further includes at least four second bit-shifting components, with each of the first bit-shifting components having four outputs and each of the second bit-shifting components having seven inputs and four outputs with each output from each of the first bit shifting components being connected to an input of a different second bit-shifting component and the remaining two inputs, representing the two least-significant bits of each second bit-shifting component, being held at zero for shifting the one digital word by four bit steps.

7. Digital scaling apparatus as claimed in claim 1 wherein the bit shifting means includes a plurality of bit-shifting circuits each connected to receive a digital word and each including means for controlling the bit-shifting circuit to shift the bits of the digital word toward the most significant bit any whole integer up to a predetermined maximum shift.

8. Digital scaling apparatus as claimed in claim 1 wherein the bit shifting circuits each include a plurality of first components connected to shift the bits a single bit and a plurality of second components connected to shift the bits a plurality of bits with the first and second components being interconnected to shift the bits any whole integer up to the predetermined maximum shift.

9. Digital scaling apparatus as claimed in claim 1 wherein the encoding means includes a plurality of circuits each connected to receive one of the plurality of digital words, each of said circuits being constructed to provide a digital output shifting command representative of the number of bits the received digital word must be shifted to left justify it.

10. Digital scaling apparatus as claimed in claim 9 wherein the encoding means includes circuitry for selecting the smallest digital output shifting command.

11. Digital scaling apparatus as claimed in claim 10 wherein the selected smallest digital output shifting command is connected to the bit shifting means and the bit shifting means contains circuitry for receiving the command and shifting the digital words in accordance therewith.

* * * * *